United States Patent [19]

Ott et al.

[11] Patent Number: 5,356,470

[45] Date of Patent: Oct. 18, 1994

[54] MEDIA MILLING PIGMENT SLURRIES TO ELIMINATE OR REDUCE OVERSIZE PARTICLES

[75] Inventors: Michael W. Ott; Brian W. Sullivan, both of Newark, Del.

[73] Assignee: E. I. Du Pont de Nemours and Company, Wilmington, Del.

[21] Appl. No.: 93,638

[22] Filed: Jul. 19, 1993

Related U.S. Application Data

[63] Continuation of Ser. No. 995,511, Dec. 21, 1992, abandoned, which is a continuation of Ser. No. 811,894, Dec. 20, 1991, abandoned, which is a continuation of Ser. No. 550,103, Jun. 25, 1990, abandoned.

[51] Int. Cl.$^5$ .............................................. C09C 1/36
[52] U.S. Cl. .................................................. 106/437
[58] Field of Search ........................................ 106/437

[56] References Cited

U.S. PATENT DOCUMENTS

3,661,522  5/1972  Colombo et al. ................... 106/437
3,758,322  9/1973  Roberts et al. ..................... 106/437

OTHER PUBLICATIONS

Perry's Chemical Engineers' Handbook, Sixth Edition, pp. 8–14, 34, 58; 1984.
"Titanium Dioxide As A Paper Filler Pigment", R. Kwoka, present at 1990 Dyes, Fillers & Pigments Short Course, Atlanta, Ga. Apr. 25–27, TAPPI press pp. 31–37.

*Primary Examiner*—Mark L. Bell
*Assistant Examiner*—Scott L. Hertzog

[57] ABSTRACT

Disclosed is a process for substantially increasing the content of particles having a size of less than 10 microns in a titanium dioxide slurry, comprising subjecting a starting material slurry containing at least 0.5% by weight of titanium dioxide particles of at least about 10 microns to media milling, whereby the content of particles greater than 10 microns is reduced by a factor of 5.

2 Claims, No Drawings

MEDIA MILLING PIGMENT SLURRIES TO ELIMINATE OR REDUCE OVERSIZE PARTICLES

This a continuation of Ser. No. 07/995,511, filed Dec. 21, 1992, abandoned, which is a continuation of Ser. No. 07/811,894, filed Dec. 20, 1991, abandoned, which is a continuation of Ser. No. 07/550,103, filed Jun. 25, 1990, abandoned.

BACKGROUND OF THE INVENTION

The present invention relates to the preparation of a composition of titanium dioxide in an aqueous slurry suitable for production of coated boards, e.g., paperboards having high gloss characteristics and surface smoothness.

Titanium dioxide slurries suitable for use in paper and paperboard manufacture are relatively well known. For example, Hall et al. disclose in U.S. Pat. No. 3,702,773, a stabilized titanium dioxide slurry of 60 to 82% by weight of $TiO_2$ for use in paper manufacturing. DeColibus discloses in U.S. Pat. No. 4,177,081 titanium dioxide slurries imparting high gloss to water-based acrylic paint systems, and Glaeser discloses in U.S. Pat. No. 4,214,913 a process for producing rutile $TiO_2$ slurries which may be used in board coating.

In order to produce coatings with sufficient gloss and smoothness, certain finishing steps are required to be performed on the slurries. Consequently, such steps as filtration, washing, drying, micronization and reslurrying are often performed. Other advantages such as improved tinctorial strength are achieved by a reduction in particle size. As a result, various techniques are known for reduction of the particle size of such slurries, e.g., mechanical grinding (Whatley et al., U.S. Pat. No. 3,342,424), steam milling micronization (Baloga, U.S. Pat. No. 4,427,451), high shear milling (Gladu, U.S. Pat. No. 4,288,254, Hall et al., above, Slepetys, U.S. Pat. No. 3,549,091, Jester et al., U.S. Pat. No. 3,380,665, micronizing process) and ball milling (Jacobs et al., U.S. Pat. No. 3,313,492).

It is desirable, however, to have a production process that yields the improved coating smoothness of conventional finishing steps.

SUMMARY OF THE INVENTION

The present invention concerns a process for reducing the amount of oversized particles greater than about 1 micron, especially those particles from about 10 to about 44 microns, in a rutile pigment slurry. The resultant slurry is particularly suitable for producing improved board coating grade titanium dioxide coatings. Reduction of the oversized particles is achieved preferably through media milling. In the following, all percentages are by weight unless otherwise indicated.

Typical slurries produced conventionally have a particle size distribution such that about 5% of the particles have a size of about 1-10 microns, and about ½-2% of the particles have a size of 10-44 microns. It has now been discovered, for the first time, that reduction of these particles, particularly those of the 10-44 microns range, enables production of improved board coatings having the smoothness and gloss of slurries produced with more expensive and laborious conventional finishing steps. Typically, slurries processed according to the invention have, subsequent to media milling, about 0.1% particles 10-44 microns, with about 94% of the particles having a size of less than about 1 micron.

Media milling is established technology for particle size reduction, with process equipment being commercially available. For example, in EP 298,777, a method of producing fine particles is disclosed involving media milling a suspension, separating a resultant slurry by size and recycling a coarse fraction to the mill. Further, JP 210,521 discloses media milling of calcium carbonate to a size below 15 microns. Pigments suitable for paper coating are obtained thereby.

In the invention, the titanium dioxide slurry having particles greater than 10 microns is fed into a grind chamber which is filled with beads. Many types of media or different sizes may be used, with one of ordinary skill in the art being able to adjust the media to produce the desired result based on the size distribution of the particles in the starting material according to conventional protocols. The media is stirred in the grind chamber by a series of discs attached to a rotating shaft. The motion of the media is perpendicular to the direction in which the slurry is pumped, and therefore the $TiO_2$ particles are sheared by the media. Typically, a screen keeps the media inside the grind chamber but allows the $TiO_2$ slurry out of the mill. Optionally, the product of the mill can be further screened.

Any titanium dioxide slurry with particles over 1 micron, preferably over 10 microns, is suitable for use in the present invention. Preferred starting materials include rutile pigment slurries as produced by Glaeser in U.S. Pat. No. 4,214,913. Typically, such slurries have on the order of 1% by weight of their particles above 10 microns, e.g., a "subgrit" level of from 10-44 microns.

Preferred is the chloride process for production of the starting material slurry. The process typically comprises oxidizing with oxygen or an oxygen containing gas, a mixture of $TiCl_4$ and $AlCl_3$, and after at least 80% of the $TiCl_4$ has been converted to $TiO_2$, the amount of $AlCl_3$ being sufficient to form 0.1–1.5% $Al_2O_3$ in the $TiO_2$. Preferably, the improved slurry for board coating is produced by (a) slurrying $TiO_2$ particles at a sufficiently high solids content so as to achieve deagglomeration of the slurry, while still permitting sufficient fluidity to permit dispersion thereof, (b) diluting the slurry to a point sufficient to permit slurry handling and transfer, and (c) media milling the slurry. Preferably the slurry is made from $TiO_2$ directly removed from the oxidation section of the process. (Sometimes referred to herein as base $TiO_2$.)

Typically, such starting material slurries in (a) have about 79–83% by weight of solids. In (b), the slurry typically is diluted to about 70–73% solids, more preferably about 72%.

A typical overall process is as follows:

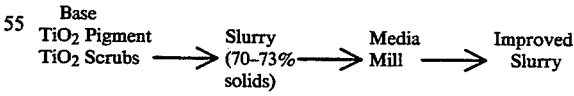

By $TiO_2$ scrubs is meant the scrub solids, such as large particle size $TiO_2$, which is used to scrub and remove build-up from the interior of the flue pipes downstream from the $TiO_2$ oxidation section.

The overall process may be conducted in a batch or continuous mode. Preferably, the process is conducted continuously.

Without further elaboration, it is believed that one skilled in the art can, using the preceding description, utilize the present invention to is fullest extent. The following preferred specific embodiments are, therefore, to be construed a merely illustrative, and not limitation of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications cited above and below are hereby incorporated by reference.

EXAMPLES

Base $TiO_2$ pigment is made as follows:

A stream of oxygen preheated to a temperature of 980° C. is introduced into one end of 10-inch inside diameter tubular, chlorine purged reactor operated at 1.76 kg/cm² gauge at a rate of 7730 kg per hour.

A titanium tetrachloride stream containing sufficient aluminum trichloride to provide one percent $Al_2O_3$ in the titanium dioxide based on the titanium dioxide is preheated to 480° C. and introduced into the reactor in vapor form through an annular ring and mixing tee to insure complete and uniform mixing with the preheated oxygen.

The temperature of the reaction gas stream is 1300°–1450° C. after the addition of the titanium tetrachloride and aluminum trichloride is complete. $PCl_3$ is then added at a point where 92% of the $TiCl_4$ was converted to $TiO_2$ through a similar annular ring in sufficient quantity to provide 0.25% $P_2O_5$ on the titanium dioxide. The PCl addition is followed by the addition of scrub solids before the reaction stream exits the reactor into cooling ducts. The reaction stream with the scrub solids is cooled. The reaction produces pigmentary size 100% rutile $TiO_2$.

Scrub solids are rutile $TiO_2$ particles of granular 20–40 mesh size that have been calcinated and are used to clean the walls of the reactor.

The base $TiO_2$ is made into rutile pigment slurry by the following process which disperses and deagglomerates the base pigment to produce a slurry product.

682 kg of $H_2O$ are added to a slurry tank. 10.9 kg of powdered tetrapotassium pyrophosphate and 16.4 kg of liquid 2-amino-2methyl-1-propanol (AMP) are added to the $H_2O$ and are stirred until dissolved. 2830 kg of $TiO_2$ prepared as described above are added over a period of 20 minutes to form a slurry. The slurry is ground for 30 minutes. The slurry contents are diluted to about 72% by adding 409 kg of $H_2O$. The slurry is screened to remove grit.

The above slurry was then fed to a 25 liter Drais media mill. The media mill's grind chamber is charged to 85% capacity with 107 lbs $Zr_2:SiO_2$ media. The media nominal size range is 1.0–1.6 mm in diameter. The milling of the slurry is done in a continuous fashion. The flow rate of the slurry through the mill is adjusted to provide a 1.27 minute grinding residence time. After passing through the grind chamber, the product slurry is separated from the grinding media by a set of screens.

The particle size distribution between 10–44 microns is determined by laboratory screening operations. The data for unmilled and milled product is summarized below:

|  | wt. % of $TiO_2$ Particles | |
|---|---|---|
|  | Unmilled | Milled |
| %30–40 microns | 0.163 | 0.010 |
| %20–30 microns | 0 183 | 0.008 |
| %10–20 microns | 0.530 | 0.058 |
| Total | 0.876 | 0.076 |

The particle size distribution between 1–10 microns is determined by Sedigraph analysis. The data for unmilled and milled product is summarized below:

|  | wt. % of $TiO_2$ Particles | |
|---|---|---|
|  | Unmilled | Milled |
| 5–10 microns | 1 | 0.5 |
| 2–5 microns | 3 | 1.5 |
| 1–2 microns | 5 | 4 |

Other property improvements determined were:

|  | Unmilled | Milled |
|---|---|---|
| High Shear Visc. (cp) | 34 | 23 |
| Dry Film Drawdown Gloss | 90 | 105 |

The viscosity was measured at 4,000 reciprocal seconds shear rate using a Hercules High Shear Viscometer. Gloss is measured as a relative reflectance on a 0.02 inch thick dry slurry film.

To further test milled pigment quality, its performance was tested by coating board samples at 40% solids loading. Coating quality was evaluated by counting the number of bumps observed per unit area at 19×magnification. The milled product produces significantly smoother board as shown below:

|  | Unmilled | Milled |
|---|---|---|
| Average number of bumps (square inch) | 642 | 179 |

The preceding examples can be repeated with similar success by substituting the generically or specifically described reactant and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for enhancing the coatability of $TiO_2$ slurries on paper and paperboards, said process consisting essentially of:
   (a) slurrying base $TiO_2$ particles produced from the chloride process at a solids content of about 79–83 percent by weight, so as to achieve deagglomeration of the slurry, while still permitting sufficient fluidity to permit dispersion thereof,
   (b) diluting the slurry to a point sufficient to permit slurry handling and transfer,
   (c) optionally removing any scrub solids in the slurry arising from the $TiO_2$ process, and
   (d) media milling the slurry until the $TiO_2$ particles having a size of about 10–44 microns are reduced to less than about 0.1 percent by weight, based on the total weight of the $TiO_2$.

2. A process according to any one of claims 1, wherein the slurry in step (a) contains about 5% by weight of particles having a size of about 1–10 microns.

* * * * *